(No Model.) 2 Sheets—Sheet 1.

W. A. WHITE.
WATER HEATER FOR CARS.

No. 362,342. Patented May 3, 1887.

WITNESSES:

INVENTOR:
W. A. White
BY Munn & Co.
ATTORNEYS.

(No Model.) 2 Sheets—Sheet 2.
W. A. WHITE.
WATER HEATER FOR CARS.
No. 362,342. Patented May 3, 1887.
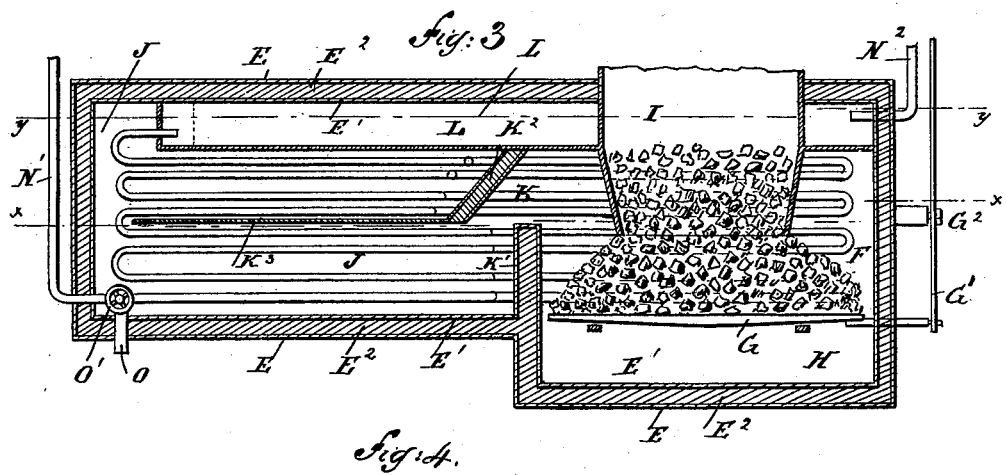
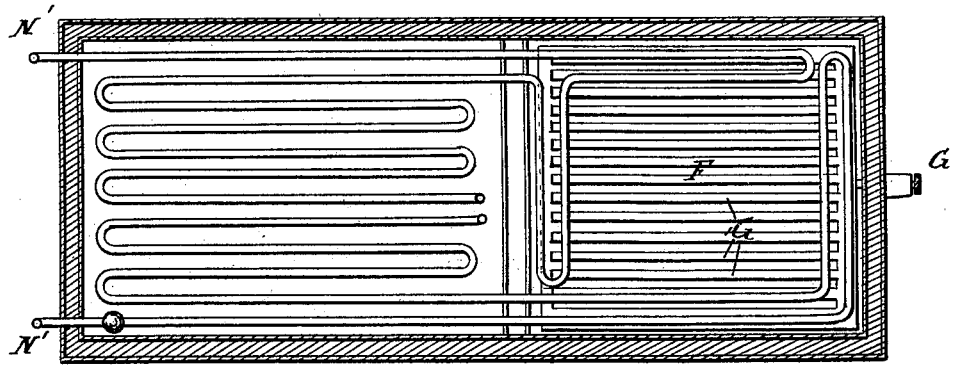
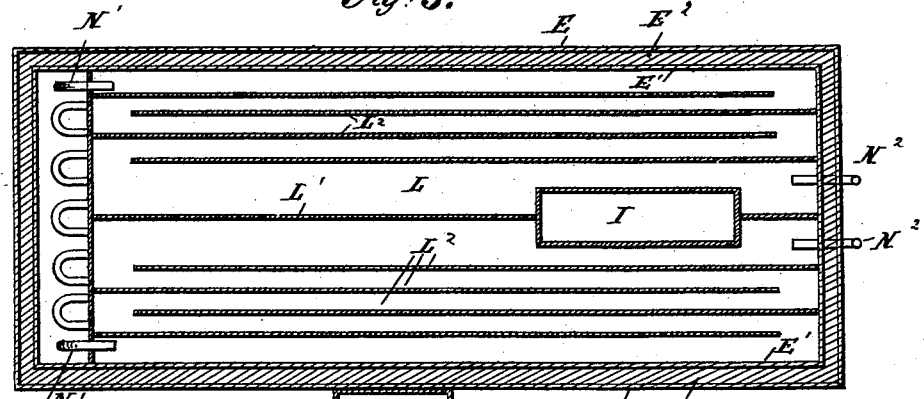
WITNESSES:
Chas. Vide
C. Sedgwick
INVENTOR:
W. A. White
BY Munn &Co
ATTORNEYS.

UNITED STATES PATENT OFFICE.

WILLIAM ANTONEY WHITE, OF STAATSBURG, NEW YORK.

WATER-HEATER FOR CARS.

SPECIFICATION forming part of Letters Patent No. 362,342, dated May 3, 1887.

Application filed March 9, 1887. Serial No. 230,717. (No model.)

*To all whom it may concern:*

Be it known that I, WILLIAM ANTONEY WHITE, of Staatsburg, in the county of Dutchess and State of New York, have invented a new and Improved Water-Heater for Cars, of which the following is a full, clear, and exact description.

The object of my invention is to provide a new and improved water-heater specially adapted for heating railroad-cars, which is simple and fire-proof in construction, and extinguishes the fire when the car is upset or wrecked.

The invention consists in the construction and arrangement of various parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
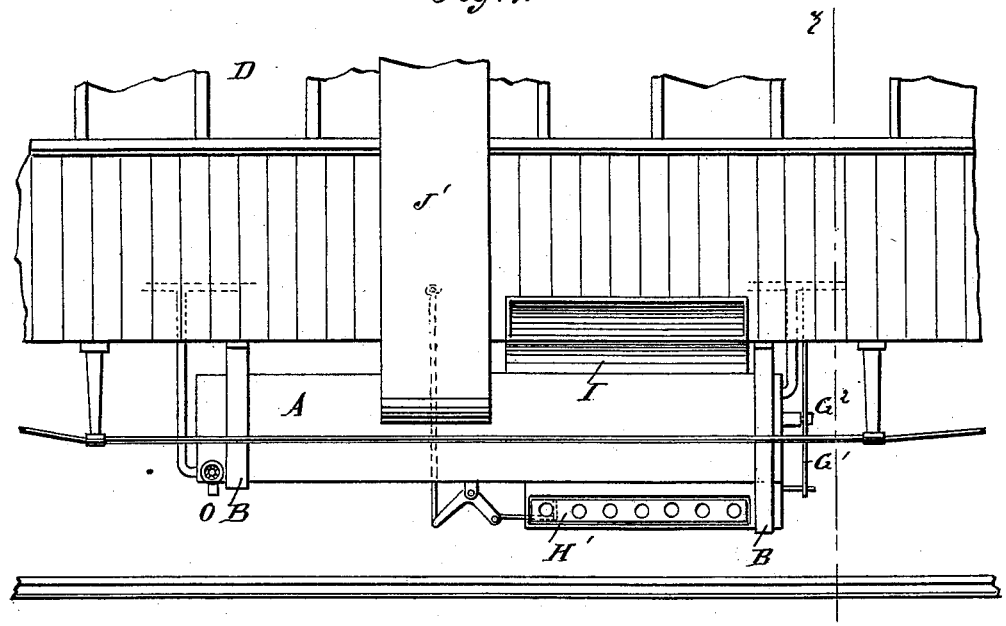
Figure 2:
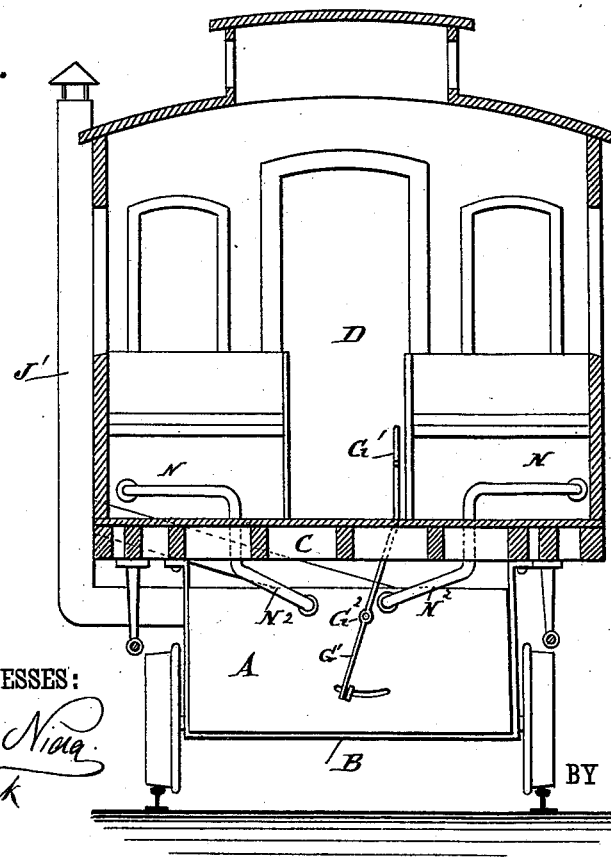

Figure 1 is a side elevation of part of a car-body provided with my improvement. Fig. 2 is a vertical cross-section of the same on the line $zz$ of Fig. 1. Fig. 3 is a vertical sectional elevation of my improvement. Fig. 4 is a sectional plan view of the same on the line $x$ $x$ of Fig. 3, and Fig. 5 is a similar view of the same on the line $y$ $y$ of Fig. 3.

The car-heater A is secured by suitable straps, B, to the under wall of the bottom C, near the middle of the car D, of any approved construction. The heater A is provided with an outside steel shell and an inside cast-iron or boiler-plate shell, E', and between the two shells E and E' is placed asbestus, E$^2$, so as to make the heater-casing fire-proof.

The heater A is also provided with a fire-box, F, in which are arranged the grate-bars G, connected with the lever G', fulcrumed at G$^2$ and extending upward through a slot in the bottom C into the car. Below the grate-bars G is formed the ash-pit H, having a draft-door, H', on one side for removing the ashes.

Any suitable means can be connected with the draft-door H' for operating the same from the car, a lever being shown in Fig. 1 for this purpose. Upon the grate-bars G opens the fuel-feeder or coal-cylinder I, extending through the shells of the heater and outward to one side of the car.

The fire-box F is connected with the heating-chamber J by the opening K, formed by the partition-walls K' and K$^2$, of which the latter is angular and continuous into the horizontally-extending partition K$^3$, reaching nearly to one end of the shell E'. The upper end of the angular partition K$^2$ abuts against the under side of the water-boiler L, secured to the inside of the top of the shell E'. From the heating-chamber J leads the smoke-stack J' to one side of the car and up the same to the roof.

Under each row of seats in the car D extends a pipe, N, one end, N', of which passes through the car-bottom C and passes into the lower part of the heater A, and then forms a coil, which extends along one side of the heating-chamber and then passes through the partition-wall K' into the fire-box F above the grate-bars G, and encircles one-half of the said fire-box, and then passes back again to the other end of the fire-box, and in like manner forward, backward, and upward in the said fire-box above the grate-bars, and finally discharges into the water-boiler L, divided by a partition, L', into two compartments.

The object of the partition L' in the boiler L is to provide two compartments, one for each row of seats in the car, so as to equalize the heat for both sides of the car.

Each of the two compartments is provided with a number of longitudinal partitions, L$^2$, each extending alternately from one end of the boiler to near the other end, so that the water discharged into the compartment by the said pipe N' passes forward and backward in the respective compartment before entering the other end, N$^2$, of the pipe N. A complete circulation of the water is thus established in each pipe N with the respective water-compartment of the boiler as the connecting-link. The outlet-pipe O, having a valve, O', is formed on the end N' for removing the water from the pipe N and the boiler L when desired.

The operation is as follows: A fire being started on the grate-bars G, it is fed by the fuel from the cylinder I, which has its top filled before the car starts on the journey. The fire can be regulated by the draft-door H', and the grate-bars can be shaken by the lever G' from the inside of the car D. The pipe N and the boiler L are charged with water, and the heat generated in the fire-box F from the fuel on the grate-bars G heats the water in the pipe N and in the boiler L, whereby a complete circulation is established in the said pipe L as the heated water passes into the pipe end $N^2$ and circulates through the pipe N, and then returns into the heater, when cooled down, through the pipe end N', which, after being coiled in the fire-box F, the heating-chamber J, and around the grate-bars G, leads back again to the said water-boiler L. The smoke arising from the fire-box F passes outward through the smoke-stack J'. It will be seen that a car can thus be thoroughly and very effectively heated by water passing through the heater A. In case the car is wrecked by accident or upset, then the water-boiler L will empty its water upon the fuel on the grate-bars G, thus extinguishing the same, and thereby preventing the heater from setting fire to the car. The flue or smoke-stack J' is of double thickness and lined with fire-proof material.

Having thus described my invention, what I claim as new, and desire to secure by Letters Patent, is—

1. In a car-heater, the combination, with a casing consisting of two metallic shells and a non-conducting filling placed between them, of a fire-box having grate-bars and inclosed by said casing, a fuel-cylinder discharging upon said grate-bars, a heating-chamber located alongside of and communicating with said fire-box, coils of pipe extending through said heating-chamber and around the sides of the fire-box, and a water-boiler located above the heating-chamber, and into which one end of each of the said coils of pipe opens, substantially as shown and described.

2. In a car-heater, the combination, with a fire-proof casing, of a fire-box formed in the said casing, grate-bars arranged in the said casing, an ash-pit having a draft-door formed below the said grate-bars, a fuel-cylinder opening upon said grate-bars, a heating-chamber connected with the fire-box above said grate-bars, coils of pipe extending around the sides of both said heating-chamber and the fire-box, and a boiler held above said heating-chamber and grate-bars and formed into two compartments by a partition to equalize the heat in both sides of the car, and having longitudinal partitions, each extending alternately from one end of the said boiler to near its other end, substantially as shown and described.

WILLIAM ANTONEY WHITE.

Witnesses:
H. L. TAYLOR,
W. C. CHAMPLIN.